(12) United States Patent
Henderson et al.

(10) Patent No.: US 8,287,684 B2
(45) Date of Patent: Oct. 16, 2012

(54) FOAM WELDING AND PROFILE MANUFACTURING SYSTEM

(75) Inventors: Randal Henderson, Franklinton, NC (US); Eduardo Lauer, Zebulon, NC (US); Julian Young, Zebulon, NC (US); Mark Stearly, Cary, NC (US)

(73) Assignee: Nomaco Inc., Zebulon, NC (US)

( * ) Notice: Subject to any disclaimer, the term of this patent is extended or adjusted under 35 U.S.C. 154(b) by 548 days.

(21) Appl. No.: 11/704,818

(22) Filed: Feb. 8, 2007

(65) Prior Publication Data
US 2007/0169884 A1   Jul. 26, 2007

Related U.S. Application Data

(63) Continuation of application No. 11/135,878, filed on May 24, 2005, now abandoned.

(60) Provisional application No. 60/574,747, filed on May 27, 2004.

(51) Int. Cl.
B29C 65/00 (2006.01)

(52) U.S. Cl. ............. 156/308.2; 156/268; 156/296; 156/309.6

(58) Field of Classification Search .............. 156/176, 156/268, 308.2, 308.4, 309.6, 296; 29/897.3, 29/897.32
See application file for complete search history.

(56) References Cited

U.S. PATENT DOCUMENTS

| | | |
|---|---|---|
| 1,519,522 A | 12/1924 | Weigel |
| 2,442,946 A | 6/1948 | Barton |
| 2,671,939 A | 3/1954 | Everhart et al. |
| 2,979,113 A | 4/1961 | Stageberg |
| 3,005,402 A | 10/1961 | Starger et al. |
| 3,083,131 A | 3/1963 | Wentz |
| 3,122,171 A | 2/1964 | Britton et al. |
| 3,188,264 A * | 6/1965 | Holden .................. 206/584 |
| 3,243,328 A | 3/1966 | Britton et al. |
| 3,301,734 A | 1/1967 | Britton et al. |
| 3,413,388 A | 11/1968 | Lux et al. |
| 3,436,290 A | 4/1969 | Reissner |
| 3,477,891 A | 11/1969 | Hawerkamp |

(Continued)

FOREIGN PATENT DOCUMENTS
DE    383161 C    10/1923
(Continued)

OTHER PUBLICATIONS

European Search Report for European Patent Application No. 05752108.0 issued Sep. 16, 2011, 3 pages.

(Continued)

*Primary Examiner* — John Goff
(74) *Attorney, Agent, or Firm* — Withrow & Terranova, PLLC

(57) ABSTRACT

By providing a high speed welding system for fusing adjacent foam profiles in a continuous manufacturing operation, a unique, integrated, foam welding and profile manufacturing system is attained which is capable of producing virtually any desired foam product from foam extrusions without requiring the use of expensive molds or forming components, and which significantly reduces expensive scrap found in prior art construction systems. In accordance with the teaching of the present invention, any desired cross-sectional shape or configuration is capable of being manufactured in fully automated, high-volume, rapid production conditions, with virtual ease and simplicity. Furthermore, by employing the present invention, foam profiles which previously were unattainable due to their structural configurations, are quickly and easily constructed in a mass production operation.

18 Claims, 7 Drawing Sheets

U.S. PATENT DOCUMENTS

| | | | |
|---|---|---|---|
| 3,557,840 A * | 1/1971 | Maybee | 138/149 |
| 3,571,559 A * | 3/1971 | Becker et al. | 219/243 |
| 3,595,367 A * | 7/1971 | Faure | 198/468.01 |
| 3,632,705 A * | 1/1972 | Makowski | 264/51 |
| 3,695,959 A | 10/1972 | Keith et al. | |
| 3,896,934 A * | 7/1975 | Graham et al. | 206/523 |
| 3,910,808 A | 10/1975 | Steward et al. | |
| 3,917,500 A | 11/1975 | Petzetakis et al. | |
| 3,943,224 A | 3/1976 | Drostholm | |
| 3,954,929 A | 5/1976 | Hoenke | |
| 3,960,998 A | 6/1976 | Allen | |
| 3,984,271 A | 10/1976 | Gilbu | |
| 3,987,604 A * | 10/1976 | MaGill | 53/113 |
| 3,988,190 A | 10/1976 | McWilliams | |
| 4,118,814 A | 10/1978 | Holtom | |
| 4,323,528 A * | 4/1982 | Collins | 264/53 |
| 4,343,672 A | 8/1982 | Kanao | |
| 4,353,763 A | 10/1982 | Simons | |
| 4,362,187 A | 12/1982 | Harris et al. | |
| 4,415,392 A | 11/1983 | Komori | |
| 4,459,168 A | 7/1984 | Anselm | |
| 4,466,854 A | 8/1984 | Hawerkamp | |
| 4,510,004 A | 4/1985 | Hawerkamp | |
| 4,613,389 A | 9/1986 | Tanaka | |
| 4,699,243 A * | 10/1987 | Enoki | 181/207 |
| 4,783,230 A | 11/1988 | Perkins | |
| 4,824,502 A | 4/1989 | Nagayoshi et al. | |
| 4,826,423 A | 5/1989 | Kemp et al. | |
| 4,952,450 A * | 8/1990 | Noel | 428/174 |
| 4,957,577 A * | 9/1990 | Huebner | 156/197 |
| 4,968,368 A | 11/1990 | Moody | |
| 5,261,988 A | 11/1993 | Dikis et al. | |
| 5,358,580 A | 10/1994 | Miyamura et al. | |
| 5,382,399 A | 1/1995 | Moret de Rocheprise et al. | |
| 5,396,755 A | 3/1995 | Arnold | |
| 5,411,619 A | 5/1995 | Sundqvist et al. | |
| 5,468,207 A | 11/1995 | Bower et al. | |
| 5,472,549 A | 12/1995 | Jurrius et al. | |
| 5,476,562 A | 12/1995 | Inhofe, Jr. | |
| 5,480,505 A | 1/1996 | Andre | |
| 5,586,963 A | 12/1996 | Lennon et al. | |
| 5,591,292 A | 1/1997 | Blomqvist | |
| 5,637,168 A | 6/1997 | Carlson | |
| 5,787,532 A | 8/1998 | Langer et al. | |
| 5,798,013 A | 8/1998 | Brandenburger | |
| 6,085,819 A | 7/2000 | Yeh | |
| 6,199,342 B1 * | 3/2001 | Court et al. | 52/664 |
| 6,244,320 B1 | 6/2001 | Musolino | |
| 6,306,235 B1 | 10/2001 | Henderson | |
| 6,537,405 B1 | 3/2003 | Henderson | |
| 6,559,432 B1 | 5/2003 | Moore, Jr. | |

FOREIGN PATENT DOCUMENTS

| | | |
|---|---|---|
| DE | 3831612 A1 | 3/1990 |
| GB | 626945 A | 7/1949 |
| GB | 1438322 A | 6/1976 |
| GB | 1466183 A | 3/1977 |
| NL | 85258 C | 6/1957 |
| WO | 8200452 A1 | 2/1982 |
| WO | 9920457 A1 | 4/1999 |

OTHER PUBLICATIONS

Advisory Action for U.S. Appl. No. 09/153,508 mailed Nov. 1, 2000.

Advisory Action for U.S. Appl. No. 11/135,878 mailed Jan. 31, 2007, 3 pages.

European Office Action for patent application 98950980.7 mailed Oct. 14, 2003, 3 pages.

Final Office Action for U.S. Appl. No. 09/153,508 mailed Jul. 18, 2000, 9 pages.

Final Office Action for U.S. Appl. No. 11/135,878 mailed Nov. 13, 2006, 13 pages.

International Search Report for PCT/US02/18037 mailed May 27, 2004, 1 page.

International Search Report for PCT/US98/21143 mailed Feb. 2, 1999, 2 pages.

Non-final Office Action for Australian patent application 200549938 mailed Apr. 24, 2009, 2 pages.

Non-final Office Action for U.S. Appl. No. 09/153,508 mailed Jan. 30, 2001, 11 pages.

Non-final Office Action for U.S. Appl. No. 09/153,508 mailed Jan. 31, 2000, 8 pages.

Non-final Office Action for U.S. Appl. No. 09/757,345 mailed Feb. 26, 2002, 10 pages.

Non-final Office Action for U.S. Appl. No. 11/135,878 mailed Jun. 15, 2006, 9 pages.

Notice of Allowance for U.S. Appl. No. 09/757345 mailed Oct. 23, 2002, 5 pages.

Office Action for Korean patent application 20007004118, mailed Oct. 24, 2005, 6 pages.

Supplementary European Search Report for patent application 05752108.0 mailed Sep. 5, 2011, 3 pages.

Supplementary European Search Report for patent application 98950980.7 mailed Mar. 24, 2003, 4 pages.

Office Action for British patent application 0008186.9 mailed Jan. 24, 2002, 2 pages.

Notice of Allowance for U.S. Appl. No. 29/342,503 mailed Dec. 16, 2009, 6 pages.

* cited by examiner

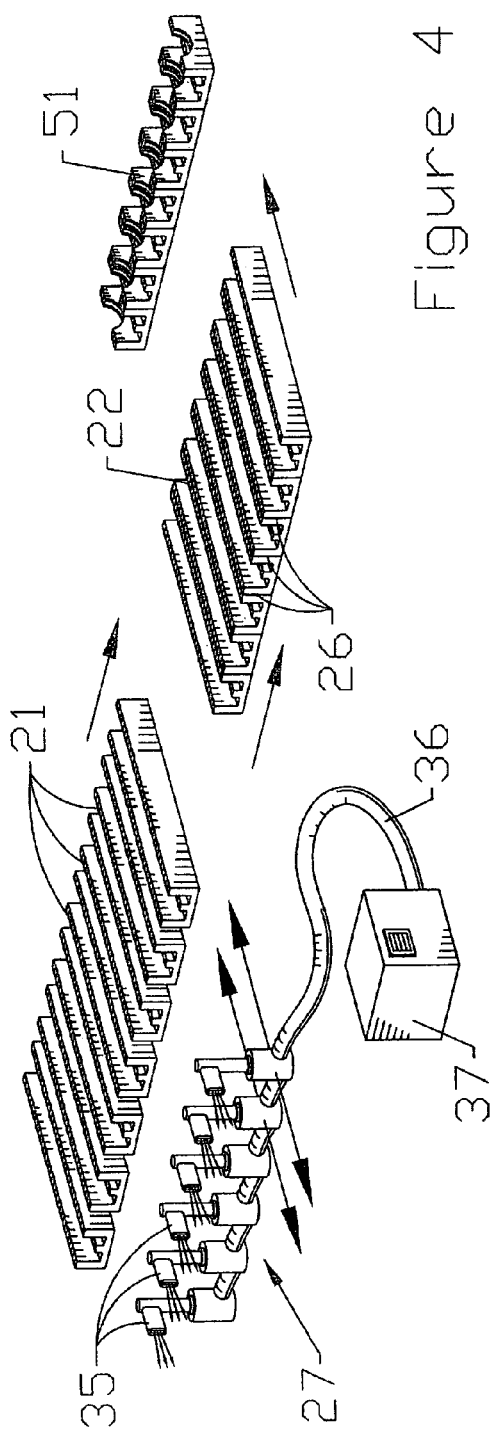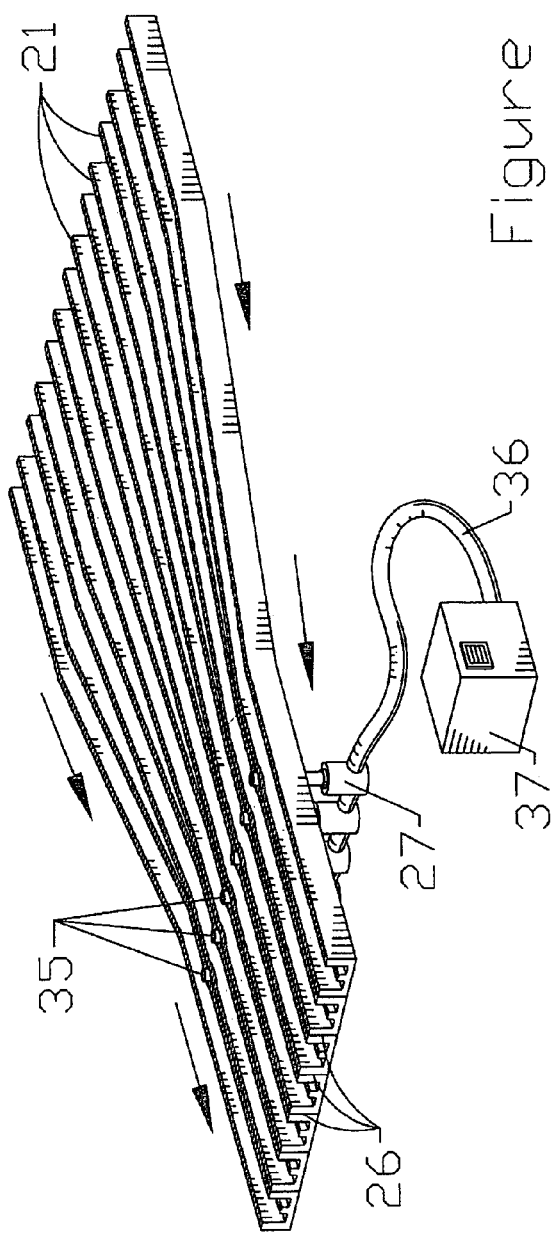

FOAM WELDING AND PROFILE MANUFACTURING SYSTEM

RELATED APPLICATIONS

This application is a continuation application of U.S. patent application Ser. No. 11/135,878, filed May 24, 2005 entitled FOAM WELDING AND PROFILE MANUFACTURING SYSTEM, now abandoned, which is related to U.S. Provisional Patent Application Ser. No. 60/574,747, filed May 27, 2004 entitled FOAM WELDING AND PROFILE MANUFACTURING SYSTEM.

TECHNICAL FIELD

This invention relates to the production of foam thermoplastic profiles or members and, in particular, to an automated system for welding foam thermoplastic profiles/members to each other to form enlarged panels and complex geometric shapes.

BACKGROUND ART

During the last decade, substantial attention has been devoted to the production of products from foam thermoplastic materials for enhancing products and improving the construction and the manufacturing expenses incurred for such products. In view of the highly competitive manufacturing costs that have been obtained from the use of foam plastic materials, the demand for foam plastic materials has increased, with substantial commercial pressure being created for improved and enhanced profile shapes and configurations.

In this regard, as the desire and demand continues to increase for incorporating thermoplastic foam profiles in a wide variety of diverse products, the shape and configuration required for the thermoplastic foam profiles becomes increasingly varied and diverse. However, due to the construction methods which exist for creating thermoplastic foam profiles in the most efficient and cost effective manner, limitations exist on the profile constructions and/or configurations which are capable of being achieved. As a result, various products where thermoplastic foam profiles are desired are incapable of being satisfied, due to the inability of thermoplastic foam profiles to be produced for such products in an economical, cost-effective manner.

Typically, thermoplastic foam profiles or elongated members are constructed by a continuous extrusion process. In this process, the elongated foam profile or member produced incorporates a single, pre-determined cross-sectional shape or configuration. Although the cross-sectional shape or configuration can be widely varied by incorporating various production techniques, the foam profile or member produced must incorporate the same cross-sectional shape or configuration throughout the entire length of the profile/member. Although this process accommodates the production of thermoplastic foam profiles/members which can be employed in numerous products and industries, other industries and products are incapable of enjoying the benefits of the thermoplastic foam profiles/members which are produced in a high volume and/or fully automated production operation, due to requirements for products which cannot employ a profile having a uniform, longitudinally extending, cross-sectional shape or configuration.

In order to accommodate the various products and industries which require specialized thermoplastic foam product configurations, special molds must be created for enabling a precisely constructed foam profile or configuration to be achieved. Typically, these operations are batch operations, requiring more labor, production costs, as well as investment for molds and other equipment required to produce the desired product. In addition, these prior art production methods typically produce excessive scrap material, causing substantially increased expenses to be realized from these prior art methods.

Consequently, it is a principal object of the present invention to provide a method for producing uniquely constructed thermoplastic foam profile configurations in a fully automated and high volume production operation wherein the foam profile configurations are incapable of being directly produced by extrusion.

Another object of the present invention is to provide a method for producing uniquely constructed thermoplastic foam profile configurations, having the characteristic features described above, which is adaptable for enabling virtually any desired configuration to be achieved.

Another object of the present invention is to provide a method for producing uniquely constructed thermoplastic foam profile configurations, having the characteristic features described above, which is capable of operating in a highly efficient and cost effective process.

Another object of the present invention is to provide a method for producing uniquely constructed thermoplastic foam profile configurations, having the characteristic features described above, which is capable of operating with a minimum of scrap material being produced.

Another object to the present invention is to provide a method for producing uniquely constructed thermoplastic foam profile configurations, having the characteristic features described above, which is capable of operating on a continuous, high-volume production operation.

Other and more specific objects will in part be obvious and will in part to appear hereinafter.

SUMMARY OF THE INVENTION

By employing the teaching of the present invention, all of the difficulties, drawbacks, and inabilities or prior art construction systems have been overcome, and a new, unique, and fully integrated foam welding and profile manufacturing system is attained which is capable of producing virtually any desired foam product from foam extrusions without requiring the use of expensive molds or forming components, and which significantly reduces expensive scrap found in prior art construction systems. In accordance with the teaching of the present invention, any desired cross-sectional shape or configuration is capable of being manufactured in fully automated, high-volume, rapid production conditions, with virtual ease and simplicity.

In one embodiment of the present invention, the fully integrated, foam welding and profile manufacturing system of the present invention employs a unique profile welding operation which enables adjacent, elongated, foam profile sections to be quickly and easily integrally welded to each other on a continuing, repeat basis, in order to form enlarged panels of the elongated foam profiles in any particular desired overall size and/or shape. In this regard, each of the elongated, foam profile sections typically comprise longitudinally extending, foam profiles which have been previously manufactured with a desired cross-sectional shape or configuration and have been cut to a desired overall length. By continuously welding sections of the elongated foam profiles to the previously welded sections, an enlarged panel having any desired configuration is quickly and easily attained.

In addition, in a further aspect of the present invention, elongated strips are cut from the welded panels in order to attain an elongated foam profile with a cross-sectional geometry or profile which would otherwise be incapable of being manufactured using normal extrusion methods. Furthermore, by repeatedly cutting the panel into the desired elongated strips, the desired configuration is capable of being achieved in a high volume, mass production.

By employing the present invention, foam profiles which previously were unattainable due to their structural configurations, are quickly and easily constructed in a mass production operation, thereby obtaining these foam profiles in any desired quantity and with highly competitive pricing. In addition, the foam profiles are produced with a structural integrity which is equivalent to or greater than the structural integrity inherent in such products.

In addition, the present invention enables complex geometric thermoplastic foam shapes of any desired three-dimensional configuration to be produced with the resulting product comprising either a specific polymer material or a composite of two or more materials. Furthermore, these products are produced in a continuous process using rapid, mass production techniques.

In an alternate embodiment of the present invention, a fully integrated, foam welding and profile manufacturing system is realized by incorporating foam extrusion components which produce an elongated foam profile on a continuous basis with the foam profile having the desired cross-sectional shape or configuration for the resulting panel and/or the component strips. By employing this additional feature of the present invention, the extrusion system continuously produces the desired elongated, foam profile which is cut subsequent to its formation into precisely desired lengths, each of which is then delivered to the welding system for welding each elongated section to the previously welded sections to form the desired panel. Thereafter, if desired, the panel is cut into a plurality of strips having the final configuration desired.

As is evident from the foregoing detailed discussion, the first step in employing the present invention is the production of an elongated, longitudinally extending, thermoplastic foam profile which incorporates a precisely desired cross-sectional configuration. Once the elongated foam profile is formed, the elongated, longitudinally extending profile is cut into precisely desired lengths which are either stored for subsequent use or are delivered directly to the welding system of the present invention. In those instances where the foam profile sections are stored, the sections are subsequently delivered to the welding system for the production of the enlarged panels and/or the uniquely configured strips formed from the panels.

During the panel formation process, each section of the thermoplastic foam profile is positioned in juxtaposed, longitudinally extending, adjacent, side to side relationship with another foam profile, and once in position, welding means longitudinally travel along the entire length of the adjacent profiles, causing the profiles to be welded into a single component. By continuously repeating this welding step, enlarged panels of fully welded foam profiles are achieved.

Once the enlarged panels of a desired configuration have been obtained, the panels are automatically advanced through a contouring station that is setup to cut any desired secondary cross-sectional shape, which is cut perpendicular to the longitudinal direction of the extruded profile panels, wherein the final, desired cutting operation is achieved. In this cutting operation, the panels are cut into sections in order to form the precisely desired thermoplastic foam product. In one typical operation, the panels are cut at an angle which is perpendicular to the longitudinally extended weld line of each foam profile. In this way, the resulting product is a complex geometric thermoplastic foam component which is completely different from the original configuration and is typically a configuration which is unattainable from an extruder directly.

In addition to cross-cutting the welded panels in a perpendicular direction relative to the longitudinal axis of each foam profile, the panels may be cut at any desired angle in order to achieve the particular final configuration. Furthermore, portions of each panel can be removed prior to final cutting, for further enhancing the overall shape of each resulting final product. Regardless of the procedures employed, it is evident that a unique and continuous thermoplastic foam shape forming and manufacturing process is realized by the present invention, for attaining virtually any desired thermoplastic, complex geometric configuration.

As is evident from the foregoing discussion, the preset invention achieves a unique extruded foam profile fusing and cutting/contouring process in order to form any desired complex geometric thermoplastic foam shape. In addition, the resulting product may comprise a specific polymer material or a multi-material composite of any desired three-dimensional configuration. Furthermore, the desired configuration is formed in a cost-effective, continuous operation with a minimum of waste or scrap material.

The invention accordingly comprises the several steps and the relation of one or more of such steps with respect to each of the others, and the apparatus embodying the features of construction, combination of elements and arrangement of parts which are adapted to effect such steps, all as exemplified in the following detailed disclosure, with the scope of the invention being indicated in the claims.

THE DRAWINGS

For a fuller understanding of the nature and objects of the invention, reference should be had to the following detailed description taken in connection with the accompanying drawings, in which:

FIGS. 4 and 5 are diagrammatic or schematic views depicting alternate welding systems for simultaneously welding a plurality of elongated foam profiles;

DETAILED DISCLOSURE

By referring to FIGS. 1-8, along with the following detailed discussion, the construction and operation of the integrated, foam welding and complex geometric profile manufacturing system of the present invention can best be understood. In addition, the ability of the present invention to achieve complex, geometric, thermoplastic foam shapes of any desired three-dimensional configuration and composition is also readily understood. It will also be understood that variations and alternate construction details can be employed without deviating from the scope of the present invention. Consequently, the foregoing Figures, along with the following detailed discussion, are provided for exemplary purposes only, and are not intended as a limitation of the present invention.

Figure 1:
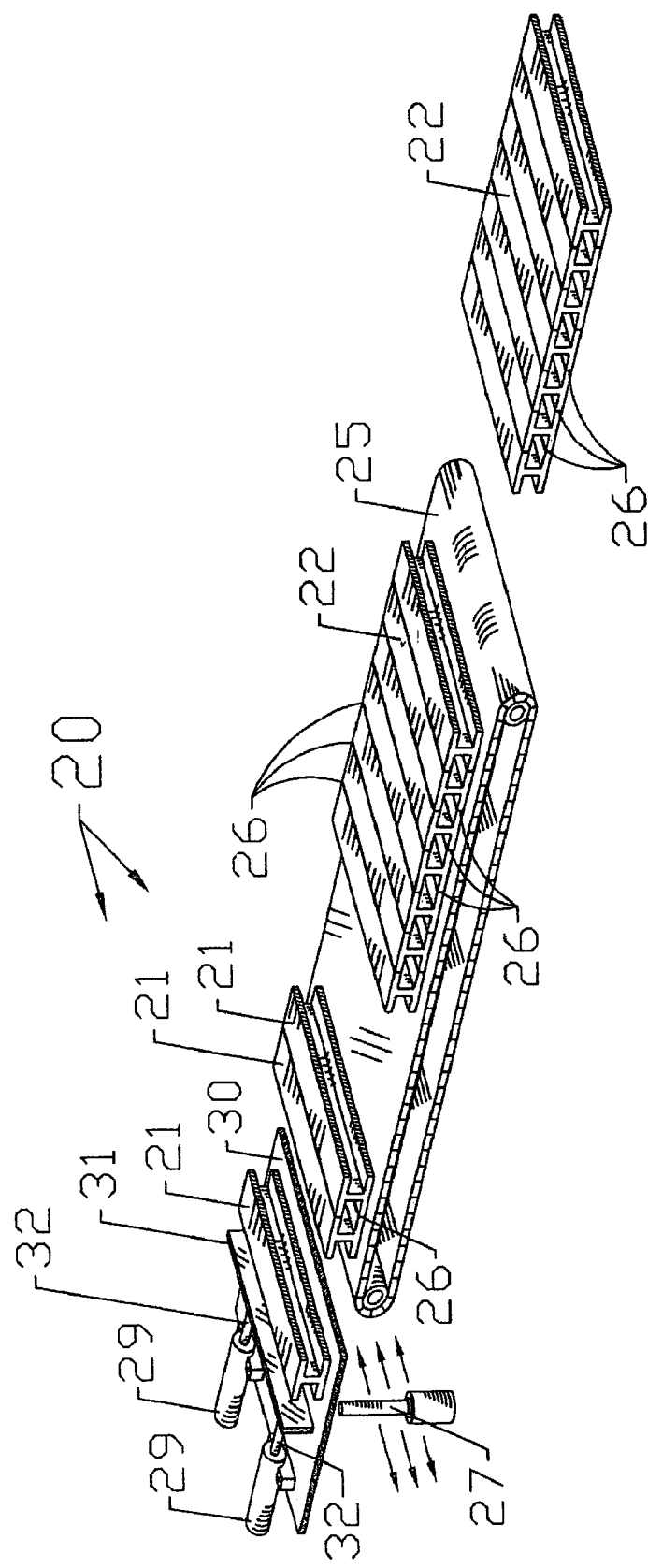
FIG. 1 is a diagrammatic or schematic view of one embodiment of the integrated, foam welding and profile manufacturing system of the present invention.

In FIG. 1, an overall, schematic representation of the principal manufacturing system 20 of the present invention is fully depicted. As shown for exemplary purposes only, elongated, longitudinally extending thermoplastic foam profile 21 is depicted as comprising a generally I-shaped cross-section and has been cut into a desired overall length. However, as is evident from the detailed disclosure contained herein, thermoplastic foam profile section 21 may comprise any desired cross-sectional configuration, size, shape, or length.

In addition, in carrying out the present invention, any desired thermoplastic foam producing composition can be employed for forming thermoplastic foam profile section 21. As examples of the wide variety of alternate compositions that can be employed and effectively used in the present invention, foam profiles may be formed from one or more selected from the group consisting of polystyrenes, polyefins, polyethylenes, polybutanes, polybutylenes, polyurethanes, polyesters, ethylene acrylic copolymers, ethylene-vinyl-acetate copolymers, ethylene-methyl acrylate copolymers, ethylene-butyl-acrylate copolymers, ionomers, polypropylenes, copolymers of polypropylene, and the like.

In employing the process of the present invention, foam profile section 21 is placed on support platform 30 in cooperating relationship with cylinders 29, 29 and movable pusher plate 31. In this embodiment, cylinders 29, 29 each incorporate axially movable rods 32 associated therewith, with plate 31 mounted to the terminating ends of rods 32. As a result, whenever cylinders 29, 29 are activated, rods 32, 32 causes plate 31 to move therewith, contacting foam profile section 21 forcing section 21 to move in its entirety in a direction perpendicular to its longitudinal axis.

The next step in employing foam welding and profile manufacturing system 20 of the present invention is the formation of enlarged panels 22 which comprise a plurality of foam profile sections 21. In order to form the desired enlarged panels, each foam profile section 21 is integrally welded to an adjacent, previously formed, foam profile section 21. In FIG. 1, two foam profile sections 21, 21 are shown on endless conveyor belt 25, after having been integrally welded to each other along welded line 26. In addition, a third foam profile section 21 is depicted, positioned on support plate 30.

In order to achieve the desired integrally welded interengagement between two adjacent foam profile sections 21, 21, welding means 27 is employed. In the embodiment depicted, welding means 27 comprises a heated rod or wire which is constructed for being rapidly advanced longitudinally along the facing side edges of the adjacent foam profile sections 21, 21.

While rapidly passing by both exposed edges of foam profile sections 21, 21, the heat emanating from welding means 27 heats the exposed edges to their melting temperature, enabling the two adjacent foam profile sections 21, 21 to be securely welded together along weld line 11. By activating cylinders 29, 29 and rods 32, pusher plate 31 is activated and forces foam profile section 21 into secure, contacting, welded interengagement with the adjacent foam profile profile 21. If desired, conveyor belt 25 may be stopped and/or reversed in direction, in order to assure the desired contact and welded interengagement between the two adjacent foam profile sections is achieved.

Furthermore, if desired, a holding or stabilizing system can also be employed for preventing unwanted slippage or movement of the welded foam profile sections during the process of welding additional foam profiles thereto. Such holding/stabilizing systems include abutment of holding members, vacuum conveyors and the like.

By continuously repeating this process, any desired number of foam profile sections 21 are welded together in order to form enlarged panel 22 having any desired overall size and shape. Once the desired panel construction is completed, panel 22 is moved off of conveyor belt 25 for further processing, as needed.

Figure 2:
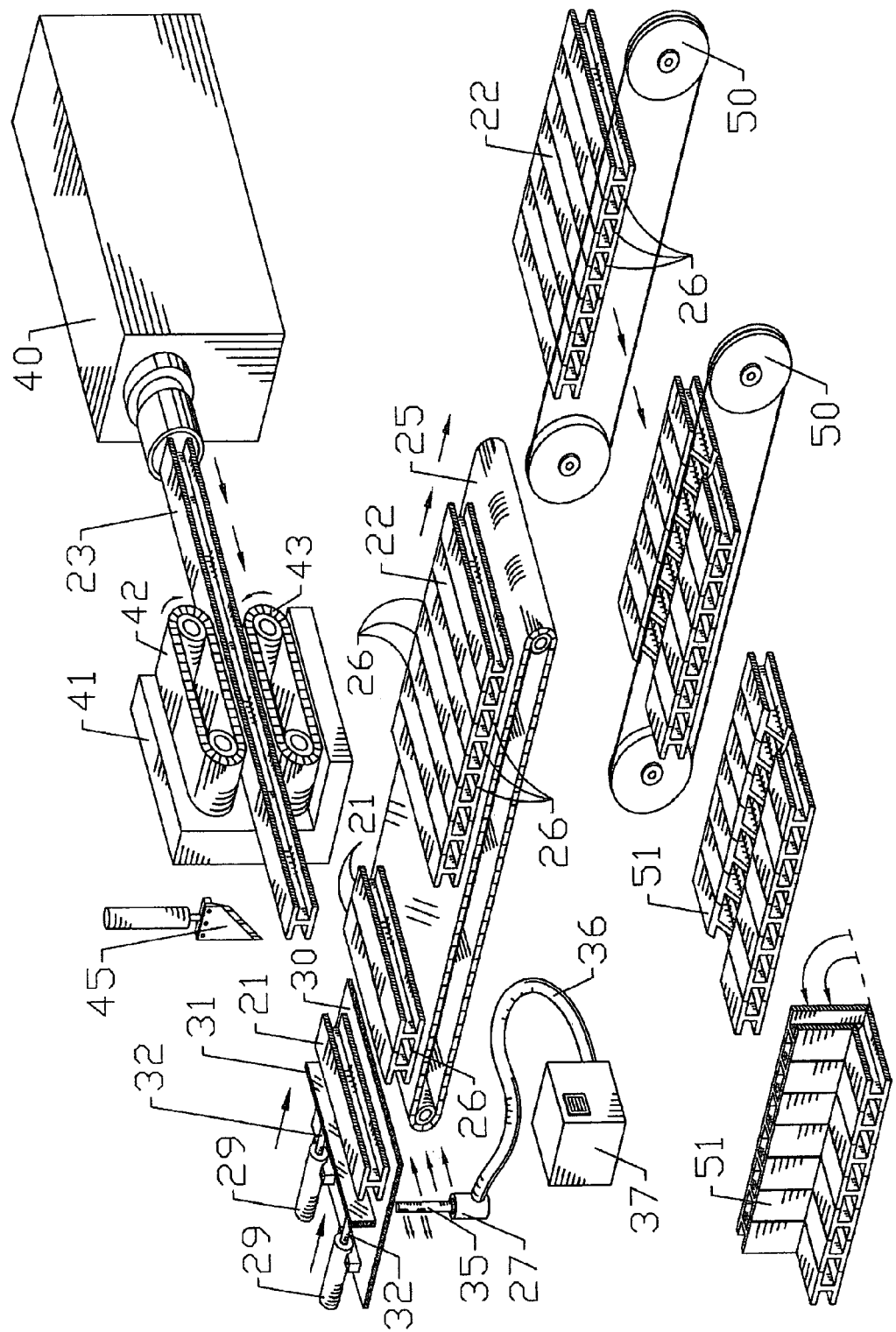
FIG. 2 is a diagrammatic or schematic view depicting a second embodiment of the overall integrated, foam welding and profile manufacturing system of the present invention and its ability to produce complex geometrically shaped foam products.

In FIG. 2, an overall, schematic representation of a second embodiment of the manufacturing system of the present invention is fully depicted. As shown, in this embodiment of the present invention thermoplastic foam producing extruder 40 is employed for continuously producing elongated, longitudinally extending thermoplastic foam profile 23. In this embodiment, thermoplastic foam profile 23 is depicted as comprising a generally I-shaped cross-section and is formed as a single, elongated, continuous component. However, as is evident from the detailed disclosure contained herein, thermoplastic foam profile 23 may comprise any desired cross-sectional configuration, size, or shape.

In addition, in carrying out the present invention, any desired thermoplastic foam producing composition can be employed for forming thermoplastic foam profile 23. As examples of the wide variety of alternate compositions that can be employed and effectively used in the present invention, the foam profiles may be formed from one or more selected from the group consisting of polystyrenes, polyefins, polyethylenes, polybutanes, polybutylenes, polyurethanes, polyesters, ethylene acrylic copolymers, ethylene-vinyl-acetate copolymers, ethylene-methyl acrylate copolymers, ethylene-butyl-acrylate copolymers, ionomers, polypropylenes, copolymers of polypropylene, and the like.

In order to assure the continuous, free flow of thermoplastic foam profile 23 from extruder 40, puller 41 is employed. As depicted, puller 41 is positioned in cooperating relationship with extruder 40 to continuously advance thermoplastic foam profile 23 in a longitudinal direction, for enabling further operations to be performed on the elongated length of thermoplastic foam profile 23. In order to achieve this desired continuous longitudinal movement of thermoplastic foam profile 23, puller 41 incorporates a pair of co-operating endless belt assemblies 42 and 43 which are positioned for contacting opposite surfaces of thermoplastic foam profile 23 and continuously draw thermoplastic foam profile 23 from extruder 40 and advance foam profile 23 in the desired direction. In this way, the desirable advantages of a continuous, mass-produced operation are realized.

Once thermoplastic foam profile 23 has been advanced away from puller 41, cutting blade assembly 45 is activated in order to produce elongated thermoplastic foam profile sections 21 in a specific overall length. Once cut, foam profile section 23 is placed on support platform 30 in cooperating relationship with cylinders 29, 29 and movable pusher plate 31. In this embodiment, cylinders 29, 29 each incorporate axially movable rods 32 associated therewith, with plate 31 mounted to the terminating ends of rods 32. As a result, whenever cylinders 29, 29 are activated, rods 32, 32 causes plate 31 to move therewith, contacting foam profile section 21 and forcing section 21 to move in its entirety in a direction perpendicular to its longitudinal axis.

The next step in the foam welding and profile manufacturing system of the present invention is the formation of enlarged panels 22 comprising a plurality of foam profile sections 21. In order to form the desired enlarged panels, each foam profile section 21 is integrally welded to an adjacent, previously formed, foam profile section 21. In FIG. 2, two foam profile sections 21, 21 are shown on endless conveyor belt 25, after having been integrally welded to each other along welded line 26. In addition, a third foam profile section 21 element 9 is depicted, after having been cut, positioned on support plate 30.

In order to achieve the desired integrally welded interengagement between two adjacent foam profile sections 21, welding means 27 is employed. In the embodiment depicted, welding means 27 comprises a hot air delivery tube 35 which is constructed for receiving hot-air from flexible conduit 36, as generated by heat producing fan member 37. In this embodiment, hot air delivery tube 35 is constructed for being rapidly advanced longitudinally along the facing side edges of the adjacent foam profile sections 21, 21.

While rapidly passing by both exposed edges of foam profile sections 21, 21, the hot air emanating from the tube 35 heats the exposed edges to their melting temperature, enabling the two adjacent foam profile sections 21, 21 to be securely welded together along weld line 26. By activating cylinders 29,29 and causing pusher plate 31 to force foam profile section 21 into secure, contacting, welded interengagement with the adjacent foam profile section 21, the desired welded engagement is achieved. If desired, conveyor belt 25 may be stopped and/or reversed in direction, in order to assure the desired contact and welded interengagement between the two adjacent foam profile sections is achieved. Furthermore, a holding or stabilizing system can also be employed for preventing unwanted slippage or movement of the welded foam profile sections during the process of welding additional foam profiles thereto. Such holding/stabilizing systems include abutment of holding members, vacuum conveyors and the like.

By continuously repeating this process, any desired number of foam profile sections 21 are welded together in order to form enlarged panel 22 having a particular, desired overall size and shape. Once the desired panel construction is completed, panel 22 is moved off of conveyor belt 25 for further processing, as detailed below.

In addition to employing the hot air delivery system detailed above for welding the plurality of foam profile sections 21 together, other welding and/or bonding systems may be employed. In this regard, as described above, fuse welding can be realized by rapidly passing high temperature elements, such as rods or wires, along the exposed edges of the adjacent foam profile elements for raising the temperature of the edges to the melt point. In addition, other systems such as adhesive bonding, mechanical bonding or laminate attachments can also be employed with equal efficacy.

Furthermore, in order to position foam profile section 21 in a precisely desired location for achieving the welding and/or bonding for the foam profile section to an adjacent foam profile section, positioning systems can be employed other than the positioning systems detailed above. In this regard, movement control arms for picking and placing each foam profile section can be employed wherein the section is moved from a first location where the section is stored or cut to a second location where the element is welded to adjacent sections. Furthermore, sweep arms, mechanical diversion systems, multi-axis conveyors and pneumatic operations can all be employed for achieving the desired movement control, and welding functions.

In addition, it is to be understood that foam profile sections 21 as well as enlarged panels 22 can be moved and positioned using a wide variety of alternate constructions an/or systems beyond the specific systems detailed herein. In this regard, a gantry pick and place system can be employed for moving these components, as well as various pneumatic and/or vacuum based conveyance systems. Regardless of which movement, conveyance, or transfer system is desired or employed, the teaching of this invention is still employed with the scope of this invention being encompassed by all such variations.

Once panel 22 has been completely formed, the final processing, trimming, and cutting operations are performed thereon. By referring to FIG. 2, representative, exemplary steps that can be performed on panel 22 are shown, and discussed below.

In addition, however, it is also possible to construct a continuous elongated, enlarged panel or continuous role of material by employing the present invention. In this regard, a single panel 22 would not be formed and, instead, foam profile section 21 would be continuously added for forming an elongated, continuous, longitudinally extending roll like member. Depending on the end use desired for such product, subsequent processing steps can be implemented during formation or subsequent thereto, if needed.

Furthermore, the present invention can also be employed for forming three-dimensional blocks of integrally welded foam profile sections 21. In achieving an end product of this nature, welding of each foam profile section would be achieved in both horizontal planes and vertical planes. Of course, the foam profile would be constructed in a manner which would enable interengagement to be realized. In addition, once the desired integrally welded block configuration is completed, further processing can be employed for constructing a wide variety of alternate products therefrom having complex geometric shapes which were previously unattainable without substantial expense and/or wasted material.

Figure 3:
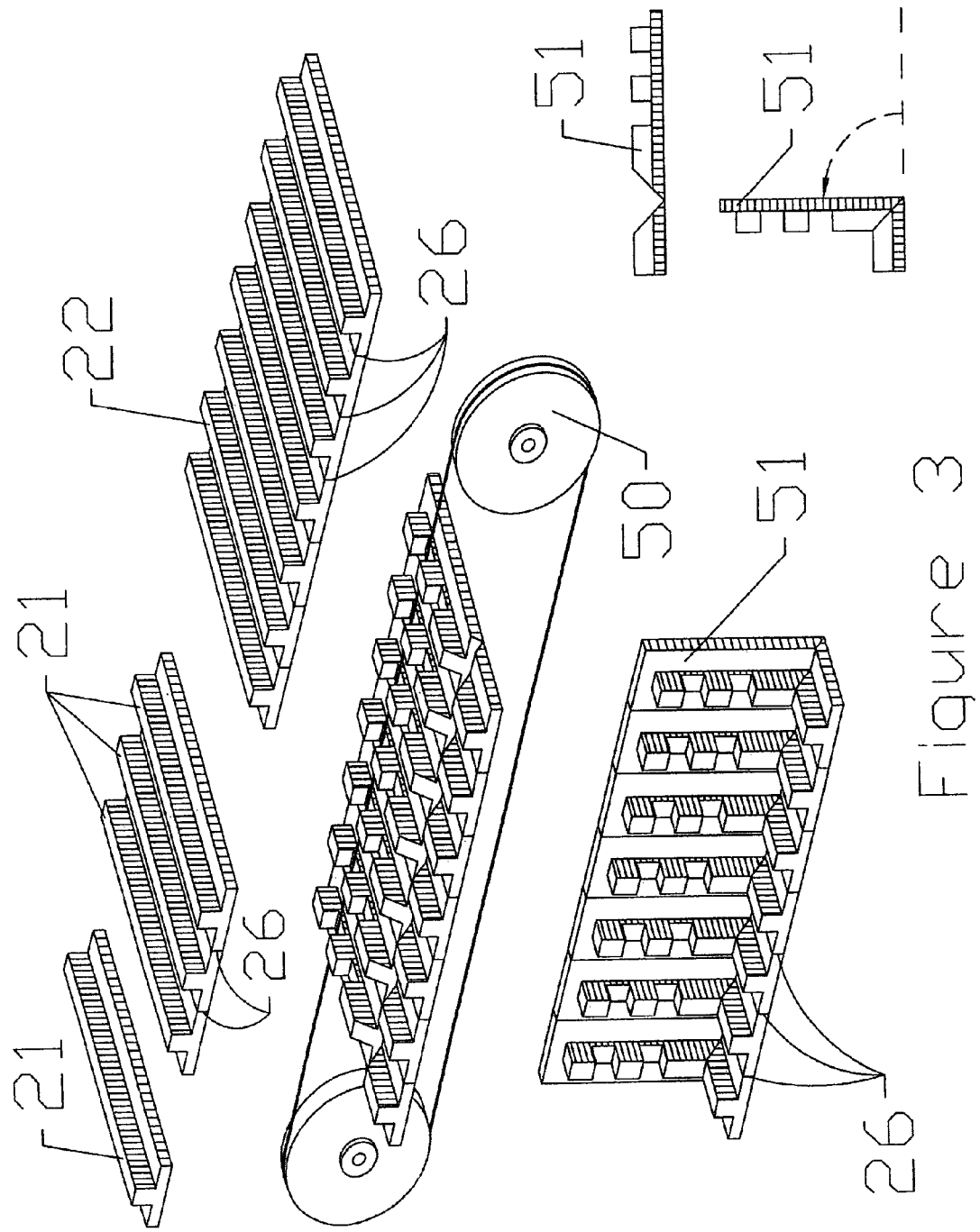
FIG. 3 is a further diagrammatic or schematic view depicting the overall integrated, foam welding and profile manufacturing system of the present invention and its ability to produce complex geometrically shaped foam products.

The versatility and unique production capabilities achieved employing the present invention, as well as the ability of the present invention to achieve complex geometric thermoplastic foam shapes of any desired three-dimensional configuration is most evident by referring to the following detailed discussion along with FIGS. 2 and 3.

As depicted, panel 22 is modified into a desired configuration by passing panel 22 through processing equipment 50. In FIGS. 2 and 3, processing equipment 50 is diagrammatically represented as a bandsaw mounted on two rotationally driven rollers. However, in actual operation, any desired processing equipment can be employed, such as millers, grinders, die cutting and stamping equipment, slitters, razors, saws, notching equipment, multi-axis machining equipment, multi-axis cutting equipment, hot blade formers and the like.

In the finishing operation depicted in FIG. 2, bandsaw cutting system 50 is employed for cutting away portions of the elongated foam profile section 21, and then cutting panel 22 into a plurality of separate, smaller segments or strips 51. In this way, each segment or strip 51 incorporates a configuration which is not able to be produced by extrusion directly.

As is evident from the foregoing detailed discussion, it has been clearly demonstrated that the integrated, foam welding and profile manufacturing system of the present invention is able to produce a plurality of elongated, continuous segments or strip 51, having a unique configuration. Clearly, depending upon the cross-sectional shape of profile 23, virtually any desired configuration an be achieved in strip 51.

As is evident to one of ordinary skill in this art, a foam product of this configuration is incapable of being produced by foam extrusion, using conventional technology. However, by employing the foam welding and profile manufacturing system of the present invention, products of this general nature are quickly and easily produced, in a continuous, manufacturing process which is capable of attaining the final product in a cost-effective manner. As a result, the present invention clearly and unequivocally overcomes all of the prior art difficulties and drawbacks and provides a unique foam welding and profile manufacturing system achieving results which have heretofore been incapable of being produced in such an efficient and effective manner.

In FIG. 3, a further depiction is provided of a complex geometric thermoplastic foam shaped product which is capable being produced by employing the present invention. As shown, panel 22 is formed from a plurality of longitudinally extending foam profile sections 21, each of which have been welded to each other along weld lines 26. In this embodiment, processing equipment 50 is employed for cutting and contouring the upstanding, vertical wall forming a part of each foam section 21.

As shown, processing equipment 50 forms a plurality of separate upstanding segments from each elongated wall, while also forming one wall portion into adjacent segments with facing slanted edged. In addition, a small notched zone is formed in the base of panel 22 directly between the slanted wall portions. As shown, this construction enables the segment, when finally produced, to be arcuately pivoted 90° to form a unique final product which would otherwise be incapable of being produced using extrusion equipment.

In FIGS. 4 and 5, an alternate construction for welding a plurality of elongated, longitudinally extending foam profile sections 21 is depicted. In this embodiment, a plurality of foam profile sections 21 are welded together simultaneously, thereby enhancing the operation and production speed of the present invention. As shown, this embodiment employs welding means 27 which comprises a plurality of hot air delivery tubes 35 mounted in cooperating engagement with each other. Each hot air delivery tube 35 is connected to flexible conduit 36 which receives the required heated air and airflow from heat producing fan member 37.

As shown in FIG. 4, by simultaneously moving each of the plurality of hot air delivery tubes 35 along the adjacent side edges of a plurality of aligned and longitudinally adjacent foam profile sections 21, the plurality of foam profile sections 21 are simultaneously welded to each other. In this way, the production speed for forming panel 22 is substantially enhanced.

Alternatively, as shown in FIG. 5, a plurality of elongated, longitudinally extending foam profile sections 21 can be positioned adjacent each other and simultaneously moved along their central axis through welding means 27. In this way, an enlarged panel is quickly and easily attained. Furthermore, as discussed above, adhesive means can be applied to the side edges of foam profile sections 21 for achieving the desired affixation.

Another feature of the present invention is the ability to produce complex geometric thermoplastic foam shaped products which are formed from multi-material composites. By enabling the resulting product to be formed, cut, processed, and/or contoured as desired, a multi-material composite product is realized having a unique cross-sectional shape or configuration which is otherwise unattainable, without employing expensive molding equipment and/or producing extensive waste.

Figure 6:
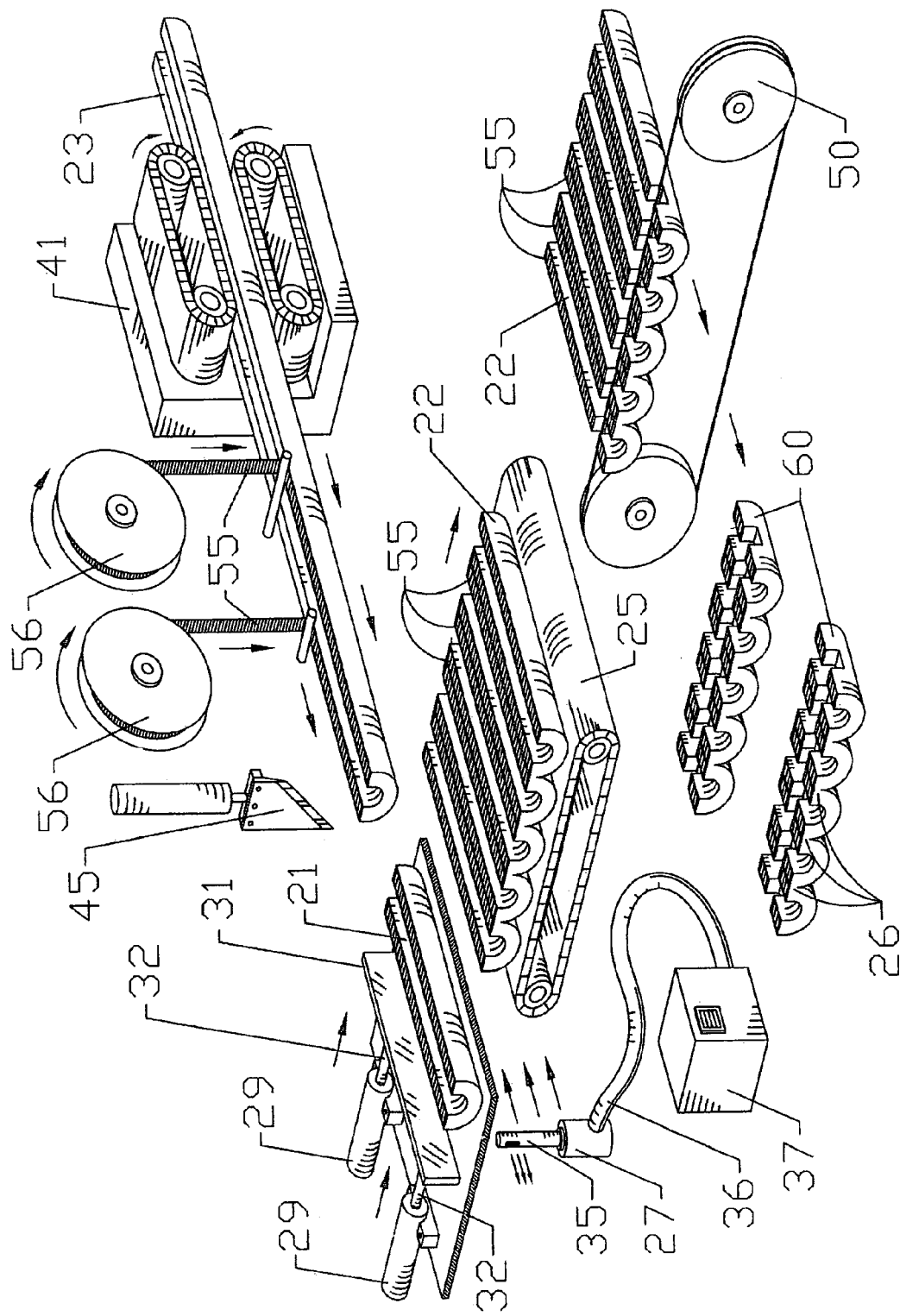
FIG. 6 is a diagrammatic or schematic view depicting the integrated, foam welding and profile manufacturing system of the present invention and its ability to produce multi-material composite products having complex geometric shapes or configurations.

By referring to FIG. 6, along with the following detailed discussion, one method of the present invention, for producing multi-material composites having a complex geometric shape can best be understood. As depicted, in this embodiment, longitudinally extending, foam profile 23, depicted with a generally U-shaped cross-sectional configuration, is formed in an extruder (not shown) and controllably advanced by puller 41. After passing through puller 41, a desired laminating material 55 is applied to the longitudinally exposed surfaces of U-shaped cross-sectional configuration of profile 23. In the embodiment depicted, laminating material 55 is mounted on rollers 56 and fed from rollers 56 directly onto the exposed of the U-shaped cross-sectional configuration of profile 23, and securely affixed thereto.

Thereafter, longitudinally extending foam profile 23 is cut by knife assembly 45 into a desired length, forming elongated foam profile section 21. Foam profile section 21 is welded to the previously formed foam profile section 21 using weld means 27 and the processing steps detailed above. In this way, panels 22 are formed, following the procedures fully discussed above, in order to achieve a panel having a desired size and shape, with laminating material 55 permanently mounted thereto, resulting in a multi-material composite product.

Once panel 22 has been formed, panel 22 is advanced into processing equipment 50, in order to form a desired resulting complex geometric thermoplastic foam component 60. In the processing depicted in FIG. 6, a portion of each panel 22 is removed prior to cutting panel 22 into elongated longitudinally extending components 60. In this way, uniquely constructed components 60 are created having a precisely desired complex geometric shape while also comprising a multi-material composite. As a result, it is evident that the present invention can be used in this further alternate manufacturing process to further enhance the viability and production capabilities of the present invention.

Figure 8:
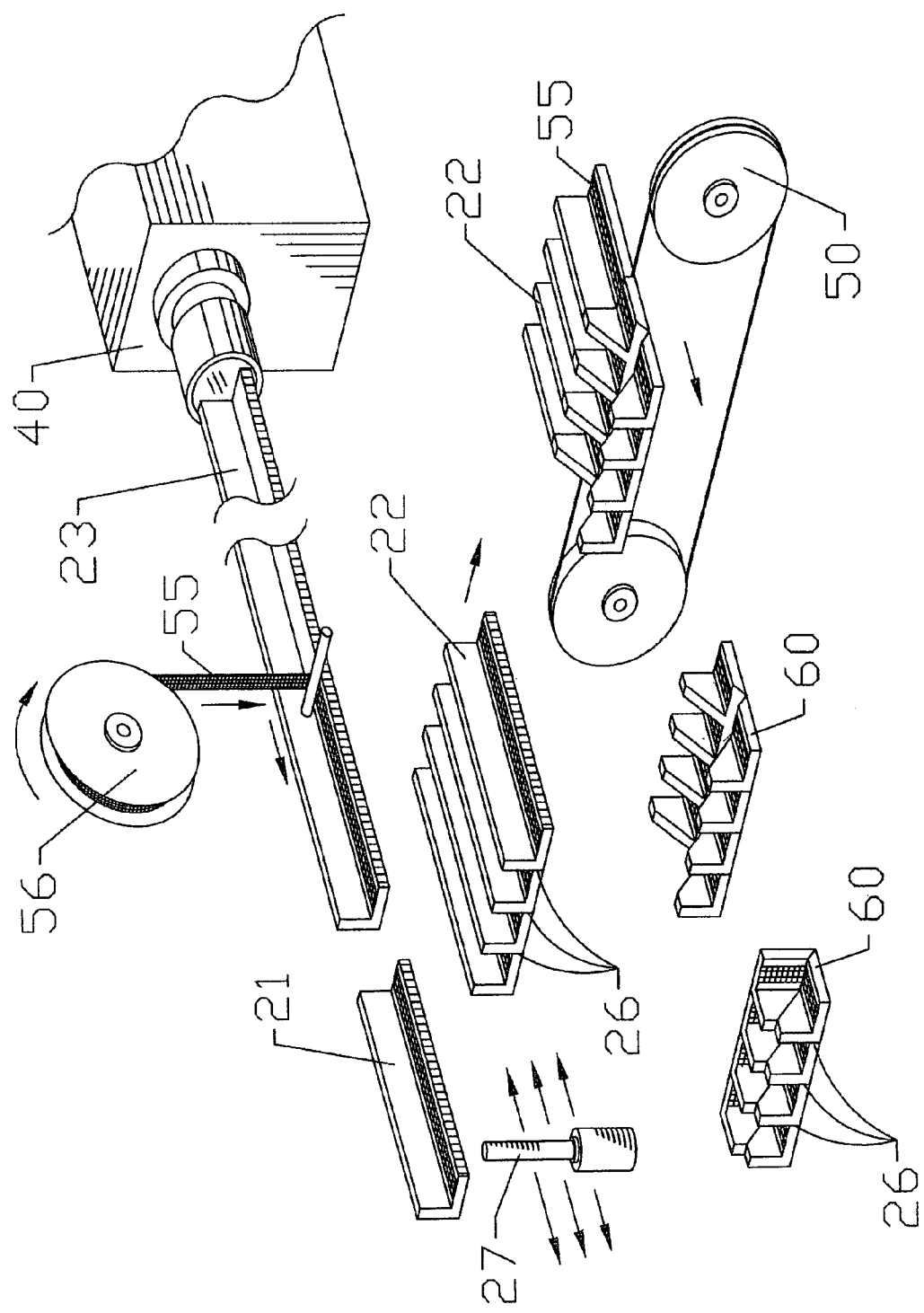
FIG. 8 is a diagrammatic or schematic view depicting the integrated, foam welding and profile manufacturing system of the present invention and its ability to produce further multi-material composite products having complex geometric shapes or configurations.

In FIG. 8, an alternate, multi-material, composite product production system is depicted. In this embodiment, as with the embodiment shown in FIG. 6 and discussed above, longitudinally extending, foam profile 23, depicted with a generally L-shaped cross-sectional configuration, is formed in extruder 40 and, preferably, advanced by a puller (not shown). Thereafter, a desired composite forming material 55 is applied to a longitudinally exposed surface of L-shaped cross-sectional configuration of profile 23.

In the embodiment depicted, composite forming material 55 comprises a continuous strip of material incorporating either the hook or loop portion of well-known hook/loop fastening materials. As shown, the elongated strip of composite forming material 55 is mounted on roller 56 and fed from roller 56 directly onto the exposed surface of L-shaped cross-sectional configuration of profile 23 for being securely affixed thereto. In this way, the hook/loop bearing material forms an integral component of profile 23, for enabling subsequent use to be made of this material when the final product is formed.

In the next step, longitudinally extending foam profile 23 is cut by a knife assembly (not shown) into a desired length, forming elongated foam profile section 21. Foam profile section 21 is welded to the previously formed foam profile sections 21 using weld means 27, employing the processing steps detailed above. In this way, panels 22 are formed, following the procedures fully discussed above, in order to achieve a panel having a desired size and shape, with hook/loop fastening material 55 permanently mounted thereto and forming an integral component thereof, resulting in a multi-material composite product.

Once panel 22 has been formed, panel 22 is advanced into processing equipment 50 in order to form a desired complex geometric thermoplastic foam component 60. In the processing depicted in FIG. 8, a portion of each panel 22 is removed prior to cutting panel 22 into elongated longitudinally extending component 60. In the final step, one segment of component 60 is arcuately pivoted and secured to the other segment in order to form a uniquely constructed final product having a complex geometric shape. In addition, foam component 60 incorporates hook/loop fastening material integrally affixed to surfaces thereof, for enabling other independent products which incorporate the opposed fastening material to be capable of nested, secure interengagement with the cooperating surfaces of foam component 60.

Figure 7:
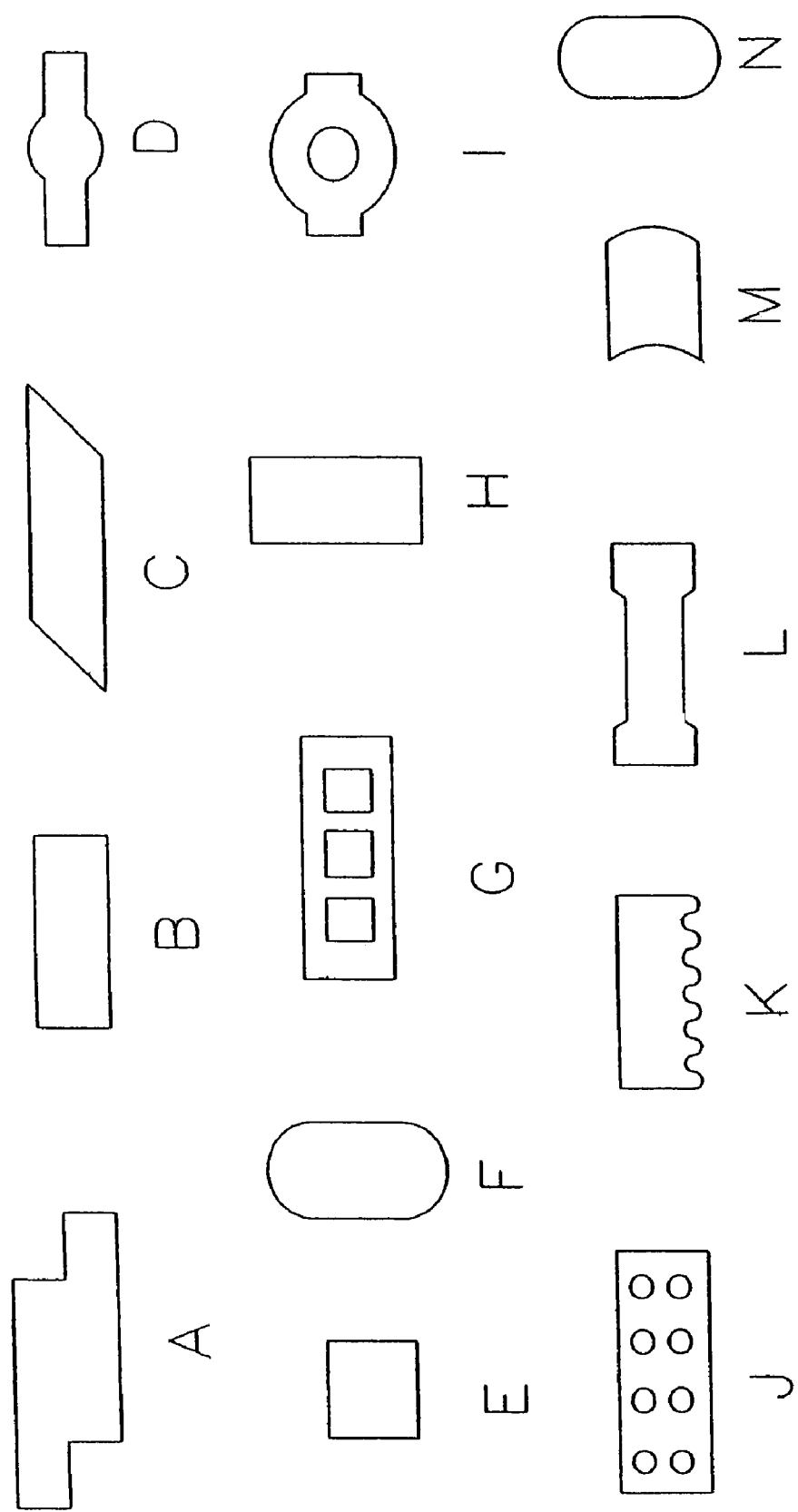
FIG. 7 is a series of cross-sectional views of alternate configuration for the extruded thermoplastic foam profile.

In FIG. 7, various alternate exemplary shapes are provided representing further cross-sectional shapes which may be employed in the foam welding and profile manufacturing system of this invention. Although these alternate shapes are not exhaustive of the wide variety of cross-sectional configurations that can be employed, the shapes are provided as an example of the various configurations that may be used in addition to the configuration shown and detailed above.

It will thus be seen that the objects set forth above, among those made apparent from the preceding description, are efficiently attained and, since certain changes may be made in carrying out the above process and in the construction set forth departing from the scope of the invention, is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described our invention, what we claim is new and desire to secure by Letters Patent is:

1. A process for automating the manufacturing of foam panels comprised of a plurality of elongated foam sections each comprised of a foam thermoplastic profile, comprising:
   (a) continuously extruding an elongated member of a foam thermoplastic profile including a desired cross-sectional shape in a longitudinally extending length;
   (b) providing on an endless belt a previous elongated section of the foam thermoplastic profile from the elongated member, wherein the previous elongated section has a first edge and a second edge opposite of the first edge;
   (c) while continuously producing the elongated member:
      (1) providing a next elongated section of the foam thermoplastic profile from the elongated member, wherein the next elongated section has a first edge and a second edge opposite of the first edge;
      (2) positioning, on a support plate, an edge of the next elongated section into juxtaposed, parallel, adjacent, side-to-side relationship with an edge of the previous elongated section on the endless belt; and
      (3) advancing a welding member between the first edge of the next elongated section on the support plate and the second edge of the previous elongated section on the endless belt and pressing the previous elongated section and the next elongated section together using a pusher plate for causing the previous elongated section and the next elongated section to be securely bonded to each other, wherein the previous elongated section is securely bonded to the next elongated section as an aggregate forms the previous elongated section; and
   (d) continuously repeating (a)-(c) as desired thereby forming a fully integrated, continuous panel comprising a plurality of elongated sections of the foam thermoplastic profile securely bonded to each other to form the panel of a desired number of elongated sections.

2. The process of claim 1, wherein advancing the welding member further comprises advancing the welding member at a rate of speed and temperature for causing the first edge of the previous elongated section and the second edge of the next elongated section to be melted.

3. The process of claim 1, wherein the pressing further comprises applying a force to the first edge of the previous elongated section and the second edge of the next elongated section for compressing melted edges of the previous elongated section and next elongated section into a secure interengagement with each other.

4. The process of claim 1, further comprising continuously repeating (a)-(c) until a desired overall length of the fully integrated, continuous panel has been achieved.

5. The process of claim 1, wherein the desired cross-sectional shape is selected from a group consisting of rectangles, squares, parallelograms, polygons, ellipses, circles, ovals, combinations thereof, and portions thereof.

6. The process of claim 1, wherein the desired cross-sectional shape of the foam thermoplastic profile comprises a combination of separate and distinct cross-sectional shapes integrally formed as a single component.

7. The process of claim 1, wherein the desired cross-sectional shape of the foam thermoplastic profile comprises one selected from the group consisting of configurations having a T-shape, an H-shape, a W-shape, an E-shape, a Y-shape, a D-shape, an F-shape, a V-shape, a B-shape, a Z-shape, and the like.

8. The process of claim 1, wherein the desired cross-sectional shape of the foam thermoplastic profile is solid.

9. The process of claim 1, wherein the desired cross-sectional shape of the foam thermoplastic profile comprises at least one aperture longitudinally extending through substantially the entire length thereof.

10. The process of claim 1, wherein the welding member comprises one selected from the group consisting of heated wires, hot metal surfaces, and nozzles, configured to provide hot air.

11. The process of claim 1, wherein providing on the support plate the next elongated section comprises advancing the elongated member with a puller member configured for continuously drawing the elongated member from an extruder and feeding the elongated member to the support plate constructed for retaining the next elongated member.

12. The process of claim 11, wherein providing the next elongated section further comprises cooperating with a cutting member to cut the elongated member into the next elongated section including a desired length.

13. The process of claim 1, wherein the elongated member comprises a top surface, a bottom surface, a first side surface, a second side surface, and a desired cross-sectional shape including a width "W" and a thickness "T", the cross-sectional shape further including at least one elongated open zone formed in the first side surface for establishing terminating edges along the first side surface which extends substantially an entire length "L" of the elongated member and comprises a dimension less than the thickness "T".

14. The process of claim 1, comprising positioning the first edge of the next elongated section into juxtaposed, parallel, adjacent, side-to-side relationship facing the second edge of the previous elongated section by controlling motion of an endless belt.

15. The process of claim 1, further comprising cutting away, using processing equipment, at least one portion of the fully integrated, continuous panel by longitudinally cutting a plurality of strips from the fully integrated, continuous panel, wherein each of the plurality of strips having a desired size and shape; and
arcuately pivoting a segment of the fully integrated, continuous panel at the at least one portion to form a final product.

16. The process of claim 15, wherein each of the plurality of strips is formed by cutting a fully integrated, continuous panel along a cut line which extends substantially perpendicularly to a longitudinal axis formed by the bonding of the previous elongated section and next elongated section.

17. The process of claim 1, further comprising: cutting away, using processing equipment, at least one portion of the fully integrated, continuous panel; and
arcuately pivoting a segment of the fully integrated, continuous panel at the at least one portion to form a final product, thereby forming a unique configuration incapable of being produced by direct extrusion.

18. The process of claim 1, further comprising cutting away, using processing equipment, at least one portion of the fully integrated, continuous panel by cutting adjacent segments at an angle to form facing slanting edges; and
arcuately pivoting a segment of the fully integrated, continuous panel at the at least one portion to form a final product.

* * * * *